Sept. 1, 1925.
W. F. MEIER
DRAFT RIGGING
Filed July 26, 1923
1,552,330
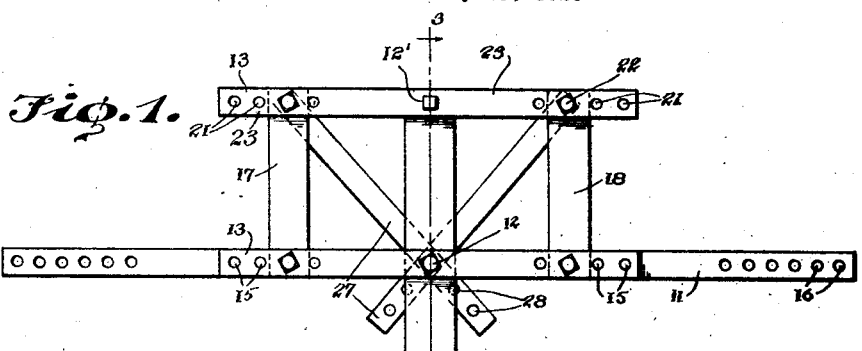
Fig. 1.
Fig. 2.
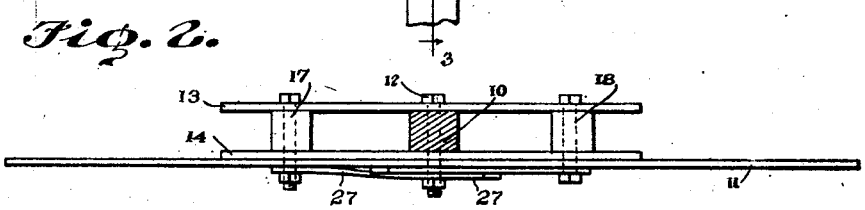
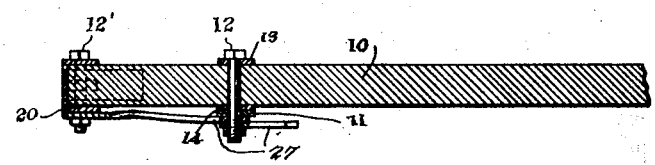
Fig. 3.
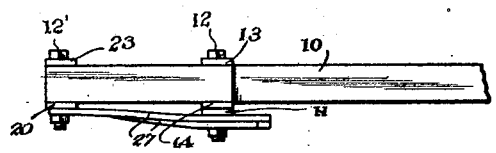
Fig. 4.
Inventor
William F. Meier
By Frank S. Appleman
Attorney Patented Sept. 1, 1925.

1,552,330

UNITED STATES PATENT OFFICE.

WILLIAM F. MEIER, OF FREDERICKSBURG, TEXAS.

DRAFT RIGGING.

Application filed July 26, 1923. Serial No. 653,983.

*To all whom it may concern:*

Be it known that I, WILLIAM F. MEIER, a citizen of the United States of America, and resident of Fredericksburg, in the county of Gillespie and State of Texas, have invented certain new and useful Improvements in Draft Rigging, of which the following is a specification.

This invention relates to a draft rigging for use in substituting a pole or tongue attachment for a double pole or shaft attachment on double row planters or on cultivator blade or blades which throw the soil inward, and a central cultivator blade or a pair of cultivator blades which throws the soil simultaneously in both directions or toward the side cultivators.

An object of this invention is to produce a draft rigging that will relieve the burden of the draft animal that works between the poles or shafts of a draft rigging of known construction as two-row planters or cultivators.

A further object of this invention is to produce a tongue attachment or draft rigging whereby the width of the draft rigging can be reduced as compared with draft riggings employing shafts, thus making it possible to pass through gates or openings of less size, than the size of the gates or openings required for draft riggings in which two shafts are employed. This is especially true where device is used with four draft animals.

It is a further object of this invention to produce a draft rigging which will cause the plows or blades to operate more steadily than those equipped with the shaft attachments, and the draft rigging of the invention requires less area in which to turn with the implements above mentioned.

A further object of this invention is to provide a draft rigging in which the connections between the harness of the draft animals and the yokes or tongues are of reduced number as compared with those employing shafts, or two poles, and to provide means whereby in cultivators a central double mole board plow may be used.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of the rear end of the draft rigging, showing a device embodying the invention applied thereto;

Figure 2 illustrates a front elevation thereof;

Figure 3 illustrates a sectional view on the line 3—3 of Fig. 1 and

Figure 4 illustrates a view in side elevation of the said device.

In these drawings, 10 denotes a tongue which is to be substituted for shafts of the implements heretofore indicated, and a cross bar 11 which is secured to the tongue by a king pin 12. The said cross bar 11 is associated with a frame comprising upper and lower bars 13 and 14 that are parallel with the first mentioned cross bar 11 and of less length than said bar. The said bars 13 and 14 have sets of apertures 15 near each end which afford adjustments, as will presently appear, it being understood that the cross bar 11 also has apertures corresponding or registering with the apertures 15 and at its end portions with apertures 16 for connecting thereto double trees. Sills 17 and 18 have their front ends secured between the said cross bars 13 and 14 by fastenings such as bolts or the like that pass through corresponding apertures in the bars and in the sills, it being seen from an inspection of the drawing that the presence of a plurality of apertures 15 near each end of the bars 13 and 14 affords means by which the sills can be adjusted laterally to set close to or further from the tongue. The apertures provide means for connecting the rigging to the frame of a cultivator or planter and may also be used for connecting the draft bar 11 to the said frame.

The rear end of the tongue is held between bars 23 and 20 by a bolt 12, and these bars near their ends have apertures 21 for bolts 22 which pass through the sills 17 and 18. The bolts 22 that connect the bars 23 and 20 also connect thereto the rear ends of brace bars 27 which cross and are engaged by the bolt 12 at the point of intersection.

The several bars including the braces have a plurality of apertures to provide for several adjustments of the sills relative to the tongue and to the frame of a planter or cultivator so that one standard structure may be used with makes of different sizes.

I claim:

1. In a draft rigging for planters or cultivators comprising a tongue, a laterally extending draft bar having end and intermediate sets of apertures therethrough connected to said tongue, a frame having parallel side bars connected at their rear ends by a cross bar, the forward ends thereof being anchored to the draft bar, diagonally disposed braces extending from the rear end portions of the parallel side bars and crossing each other at the intersection of the draft bar and the tongue, said tongue having its rear end connected to the frame and projecting forwardly beyond the laterally extending draft bar and the point of intersection of the draft bar, the tongue and the diagonal braces.

2. A draft rigging for planters or cultivators comprising a transverse draft bar, a pair of parallel sill pieces which extend rearwardly from the draft bar, said sill pieces having their forward ends in adjustable connection with said transverse draft bar, bars maintained above and below the front and rear ends of the sill pieces and connected to the ends thereof, said bars having a plurality of apertures therethrough, bolts for connecting the bars in laterally adjustable relation with the sill pieces, a tongue connected to said front and rear bars and said draft bar and extending beyond said front bars, brace bars which extend forward from the rear ends of the sill pieces and intersect at a point where they cross the draft bar and the tongue, said brace bars having adjacent to their forward ends a plurality of apertures, and a bolt for connecting the transverse draft bar and the tongue with the brace bars.

WILLIAM F. MEIER.